United States Patent [19]
Shimada

[11] 3,915,029
[45] Oct. 28, 1975

[54] OPERATING LEVER FOR GEAR-SHIFTING MEANS OF A BICYCLE

[75] Inventor: Shozo Shimada, Sakai, Japan

[73] Assignee: Shimano Industrial Company Limited, Sakai, Japan

[22] Filed: Sept. 9, 1974

[21] Appl. No.: 504,191

[52] U.S. Cl. .................. 74/501 R; 74/531; 74/535; 64/30 C; 192/46; 192/48.3
[51] Int. Cl.² .......................................... G05G 5/18
[58] Field of Search ............ 74/489, 487, 501, 531, 74/535, 217 B; 64/30 R, 30 C; 192/46, 48.3, 55

[56] References Cited
UNITED STATES PATENTS
3,693,469  9/1972  Ozaki.................................. 74/489

Primary Examiner—Samuel Scott
Assistant Examiner—Allan R. Burke
Attorney, Agent, or Firm—Stevens, Davis, Miller & Mosher

[57] ABSTRACT

An operating lever for gear-shifting means of a bicycle, is formed of a lever body retaining one terminal of a control cable and a resistance member applying a desired frictional resistance on the lever body, which lever body and resistance member are combined into a unit so that the unit may be rotatably supported to a fixed shaft of the lever and also the resistance member is provided at the inner surface thereof with ratchet teeth engagable with pawls supported to the fixed shaft, whereby when the lever body is turned against the return spring force of the gear-shifting means the resistance member is allowed to be freely rotatable together with the lever body, on the contrary, when turned following the return spring force the resistance member is adapted to be locked for applying a desired frictional resistance on the lever body.

5 Claims, 3 Drawing Figures

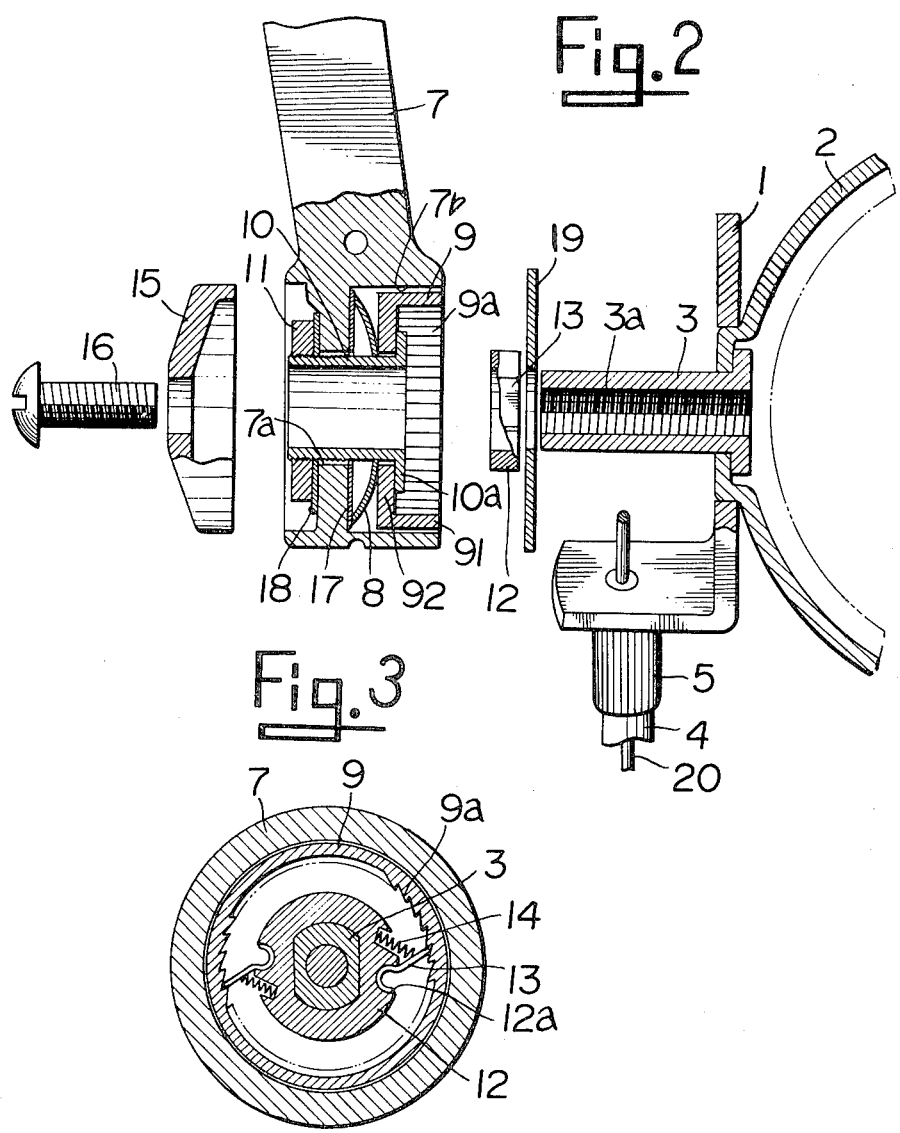

OPERATING LEVER FOR GEAR-SHIFTING MEANS OF A BICYCLE

This invention relates to an operating lever for a bicycle gear-shifting means.

Conventionally, an operating lever for gear-shifting means is rotatably pivotally supported to a fixed shaft which is mounted to a base plate fixed to a bicycle frame member, e.g., a top tube thereof, and the lever is adapted to be locked in a selected position defined for speed changing. The reason is that the lever-operable gear-shifting means without distinction of an interval and an external housing one, is always provided with a spring means for the purpose of restoration, accordingly, the above-mentioned frictional resistance is set to an extent enough to overcome the return spring force.

From this, the force overcoming the frictional resistance in addition to that greater than the return spring force must be applied on the lever when operated against the return spring, which causes the lever to be heavily operated, thus there has been such a defect as unsmooth gear-shifting operation.

Lately, the invention of U.S. Pat. No. 3,693,469 has been directed to eliminate the abovementioned disadvantage as that the lever shaft is rotatably provided with a ratchet wheel having ratchet teeth at the outer periphery thereof, which wheel is subjected to the predetermined frictional resistance with a washer and a washer pressing member and also the lever body has a pawl engagable with the ratchet teeth, thus, at the lever turn in one direction, i.e., in a direction against the spring return force, the disengagement of the pawl with the ratchet wheel subject to the frictional resistance may cause the lever to be operated in a light touch, while, in a halt of the lever turn at a desired speed changing position, the pawl becomes engagable with the ratchet teeth so that the lever may be held in a halt through the ratchet wheel.

The abovementioned construction of the lever may solve the problem as aforegoing, however, since the frictional resistance overcoming the return spring force is applied on the lever body through the pawl secured thereto and the ratchet wheel, there has still been such a defect as not only a complicate construction of the lever but also trouble for adjusting the frictional resistance value by a user after every dismantling of the lever apparatus.

The present invention is directed to eliminate the abovementioned disadvantages so as to provide a more improved lever for operating gear-shifting means. A main object of the invention is the provision of an operating lever having a boss of the lever body, in which previously is fabricated a resistance member applying to the lever turn the frictional resistance overcoming the spring return force so that the lever body may easily be assembled with the fixed shaft. Another object of the invention is the provision of an operating lever capable of being reassembled with the fixed shaft without adjustment of the frictional resistance value even at dismounting of the lever apparatus by a user.

These objects of the invention will be clarified in the following description and the detailed construction thereof will be apparent with the accompanying drawings, in which;

FIG. 2 is a partially cutaway elevational view thereof in an exploded state, and FIG. 3 is sectional view taken on Line III—III in FIG. 1.

Figure 1:
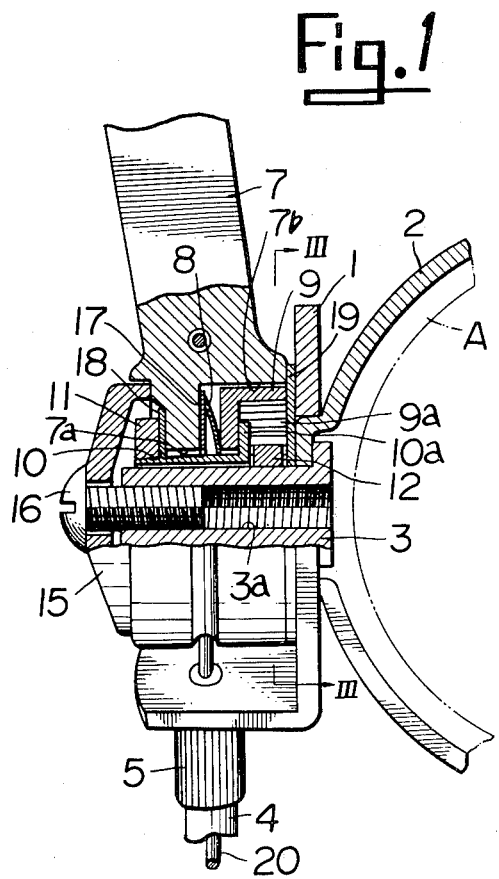
FIG. 1 is a partially cutaway elevational view of the invention.

Referring to the drawings, the reference numeral 1 designates a base plate having at one side a fitting metallic member 2 capable of being fixed to a bicycle frame member A and at the other side a fixed shaft which is provided at the inner surface thereof with screw thead 3a. The base plate 1 is provided with a retainer 5 for an outer cable 4 and a stopper (not shown) for controlling an operating lever to be turned in a given range.

The reference numeral 7 designates a lever body freely rotatably pivotally supported with the fixed shaft 3, of which a boss is provided at the center thereof with a shaft hole 7a of a diameter greater than the outer diameter of the fixed shaft and an annular chamber 7b of a diameter greater than that of the shaft hole 7a, which annular chamber extends coaxially adjacently of the hole 7a and opens outwardly of one side thereof. A resistance member 9 having ratchet teeth 9a at the inner surface thereof is relatively rotatably insertibly mounted to the annular chamber 7b through a washer 8.

The resistance member 9 serves to apply a given frictional resistance to the body 7 turn, which is formed of a cylindrical portion 91 of an outer diameter smaller than the inner diameter of the chamber 7b and an annular portion 92 perpendicularly extending from one end of the cylindrical portion 91 oppositely of the bottom surface of the chamber 7b, the former portion having the abovementioned ratchet teeth 9a at the inner surface thereof. Thus, the resistance member is rotatably mountd to the boss of the lever body 7 by means of an adjusting nut 11 through the washer 8 inserted between the bottom surface of the chamber and the opposite surface of the perpendicular portion 92, and of a bushing 10 having at one end thereof a flange 10a engagable with the perpendicular portion 92 and at the other end thereof a screw thread formed at the outer periphery of the bushing.

The resistance member 9 is, as the abovementioned, assembled with the lever body 7 through the washer 8, the bushing 10 and the adjusting nut 11 for being formed into a unit of a bicycle part so that when the lever body 7 is mounted to or dismounted from the fixed shaft 3 in dismantling as shown in FIG. 3, the resistance member 9 may be assembled or dismounted together with the lever body as a unit part, whereby the frictional resistance from the resistance member 9 to the lever body 7, of which the value is previously set by means of the adjusting nut 11, may invariably be maintained by the united construction of the both even in dismantling the operating lever apparatus.

In addition, the abovementioned frictional resistance is greater than the spring return force of the gear-shifting means, which is capable of being predetermined by screwable engagement of the nut 11 with the screw thread of bushing 10.

Further, in a case that the resistance member 9 is locked with ratchet means as described hereinafter for making only the lever body 7 rotatable, the lever body becomes subjected to the predetermined frictional resistance in rotation thereof, while release of the lock causes the resistance member 9 to be rotatable together with the lever body 7, thereby making the lever body freely rotatable without any effect of the frictional resistance. Incidentally, in this construction, it is preferable to employ, as shown in the drawings, a conical disc spring as for the washer 8.

Nextly, a ratchet means for locking and releasing the resistance member 9 will be described in the following.

The ratchet means is composed of ratchet teeth 9a formed at the inner surface of cylindrical portion of the resistance member 9 and pawls 13 fitted to the fixed shaft 3 through a holding member 12, which means may not be necessary to be especially concretely defined in construction thereof but be sufficient to have such function as locking and releasing the resistance member 9 in one and the other directional turn of the lever body 7 respectively. In addition, pawls 13 are, as shown in FIG. 5, formed of metallic plates which are semi-circularly bent at the root portion thereof to be accomodated into an arciformed recess 12a at the holding member 12 in the swinging relationship therewith respectively, and then urged at the utmost end thereof towards the ratchet teeth 9a by means of a spring 14 so as to be readily engagable with the ratchet teeth. The holding member 12 supporting pawls is provided at the center thereof with a square hole which is engagable with a square shaft formed at the fixed shaft 3 so that the holding member may be unrotatably connected to the fixed shaft.

In the abovementioned embodiment of the invention, the bushing 10 formed separately from the resistance member 9 may be formed integrally therewith, and also the pawls 13 may directly be attached to the fixed shaft 3 in place of the holder 12 for supporting the same.

Further, in the drawings the reference numeral 15 designates a cover, 16 does a screw bolt for fitting the same, 17, 18 and 19 do a washer respectively, and 20 does a control wire which is retained at one terminal thereof to the outer periphery of the lever body.

The operating lever in accordance with the present invention is constructed as the abovementioned, wherein when the lever body is turned in one direction, namely, the direction that the lever is operated for gear-shifting against the return spring force of the gear-shifting means, the resistance member 9 becomes rotatable together with the lever body 7 without engagement of the pawl 13 with the ratchet teeth, thus no relative rotation between the lever body and the resistance member, causes the frictional resistance therebetween not to effect the lever body turn, thereby making it possible to allow the lever body 7 to be rotated in a light touch of a rider without any effect of rotation resistance thereof.

On the other hand, when the lever body 7 is operated for gear-shifting in the reverse direction, i.e., the same direction as the return spring compression, the pawls 13 become engagable with ratchet teeth 9a to lock the resistance member 9, therefore, the relative rotation generated between the lever body 7 and the resistance member 9, may apply the predetermined rotation resistance onto the former by means of function of the washer 8 inserted between the both, where the lever can be lightly turned in spite of the effect of the rotation resistance because of the lever turn in the direction corresponding to the return spring compression.

Furthermore, when a rider removes his hand from the lever 7 after gear-shifting, the lever may be continuously turned by the effect of return force of the gear-shifting means. In this case, however, the lock of resistance member 9 by the engagement of the pawl 13 with the ratchet teeth 9a, applies the lever body the given rotation resistance so that the lever body 7 may be held at the operated position for gear-shifting, thereby maing it possible to exactly maintain the speed chang of the bicycle.

As is clearly understood from the abovementioned description, this invention is so designed that the lever body is made to hold at the boss portion thereof the resistance member which is frictionally contactable therewith so that the ratchet means may lock or release the resistance member with or from the lever body.

Accordingly, when the lever is turned against the return spring force, it is lightly operable without any rotation resistance and also is exactly stationary at a desired gear-shifting position. Furthermore, the operating lever in accordance with the invention is simple in construction and has a predeterminable valve of the rotation resistance because the lever body is assembled and supported with the resistance member adaptable to apply a given rotation resistance thereon, still further, the assembled unit thereof is merely insertibly connected to the fixed shaft to result in easiness of assembling, thus a user being not required to adjust the frictional resistance even at every dismantling of the operating lever apparatus.

A representative embodiment of the invention has been described as aforegoing, but the invention is not limited in only this construction thereof. The embodiment described herein is merely examplified rather than defined in the scope of the invention.

What is claimed is:

1. An operating lever for gear-shing means of a bicycle, comprising,
   a. a base plate fixed to the bicycle frame,
   b. a fixed shaft fixed to said base plate,
   c. a lever body supported with said fixed shaft in the relationship of being rotatable around the shaft, said lever body being provided at the center of the root portion thereof with a shaft hole of a diameter greater than the outer diameter of said fixed shaft and with an annular chamber which is formed adjacently to said shaft hole and has a diameter greater than that of said shaft hole, and having at the outer periphery thereof a control wire of which one terminal is retained thereto,
   d. a resistance member accomodated into said annular chamber of the lever body in the rotatable relationship with the lever, said resistance member comprising a cylindrical portion and a potion which is perpendicularly extending from one end of said cylindrical portion, said perpendicular portion being opposite at one surface thereof to the bottom of said annular chamber, said cylindrical portion being provided at the inner peripheral surface thereof with ratchet teeth,
   e. a bushing urging said resistance member towards the bottom of said annular chamber so that a given frictional resistance may be applied to the lever body in a relative rotation of said resistance member and said lever body, said bushing being cylindrically elongated enough to be perforated throughout the shaft hole of said lever body and having a screw thread formed at the outer periphery of the foremost end thereof,
   f. an adjusting nut engagable with said bushing, which serves to frictionally lock said resistance member with respect to the lever body through said bushing so that said bushing may be screwably engagably positioned for previously adjusting said frictional resistance in a given value, g. pawls which are fitted to said fixed shaft at the portion of outer periphery thereof and engaged with ratchet teeth of the resistance member so that said resistance member may be prevented from rotating, and h. retaining means provided at the utmost end of said fixed shaft for preventing said lever body from axially moving.

2. The operating lever as claimed in claim 1, wherein between the bottom of the annular chamber of said lever body and one surface of the perpendicular portion of said resistance member is insertibly mounted a washer which is provided at the center thereof with a perforated hole having a larger diameter than the outer diameter of said bushing.

3. The operating lever as claimed in claim 2, wherein said washer includes a conical disc plate.

4. The operating lever as claimed in claim 1, wherein a holding member is unrotatably mounted to said fixed shaft for supporting said pawls.

5. The operating lever as claimed in claim 1, wherein said fixed shaft is formed in a cylindrical shape and provided at the inner surface thereof with a screw thread for being screwably engaged at the fixed shaft end portion with a fitting bolt accompanied by a cover so that said lever body may be prevented from axially moving.

* * * * *